United States Patent [19]
Morris et al.

[11] Patent Number: 5,259,980
[45] Date of Patent: Nov. 9, 1993

[54] COMPOSITIONS FOR DISSOLUTION OF SULFATE SCALES

[75] Inventors: Richard L. Morris, Duncanville; James M. Paul, DeSota, both of Tex.

[73] Assignee: Mobil Oil Corporation, Fairfax, Va.

[21] Appl. No.: 614,489

[22] Filed: Nov. 16, 1990

Related U.S. Application Data

[60] Division of Ser. No. 369,897, Jun. 22, 1989, Pat. No. 4,980,077, which is a continuation-in-part of Ser. No. 332,147, Apr. 3, 1989, Pat. No. 5,093,020.

[51] Int. Cl.$^5$ .................................................. C02F 5/10
[52] U.S. Cl. ...................................... 252/82; 252/80; 252/175; 252/180; 252/86
[58] Field of Search ................... 252/80, 82, 175, 180, 252/106, 156, 546, 86

[56] References Cited

U.S. PATENT DOCUMENTS

| | | | |
|---|---|---|---|
| 2,877,848 | 3/1959 | Case | 166/42 |
| 3,660,287 | 5/1972 | Quattrini | 252/8.55 |
| 3,684,720 | 8/1972 | Richardson | 252/86 |
| 3,951,827 | 4/1976 | Burrough et al. | 252/80 |
| 3,956,164 | 5/1976 | Walker et al. | 252/180 |
| 4,030,548 | 6/1977 | Richardson et al. | 166/279 |
| 4,144,185 | 3/1979 | Block | 252/180 |
| 4,190,462 | 2/1980 | DeJong et al. | 134/2 |
| 4,215,000 | 7/1980 | DeJong et al. | 252/80 |
| 4,276,185 | 6/1981 | Martin | 252/87 |
| 4,288,333 | 9/1981 | van Zon et al. | 252/82 |
| 4,708,805 | 11/1987 | D'Muhala | 210/698 |

FOREIGN PATENT DOCUMENTS 107297 7/1982 Japan.
174990 1/1985 Japan.

OTHER PUBLICATIONS

Hawley's Condensed Chemical Dictionary, 11th edition, Van Nostrand Rienhold, N.Y. 1987, pp. 391, 486.

Primary Examiner—Prince Willis, Jr.
Assistant Examiner—J. Silbermann
Attorney, Agent, or Firm—Alexander J. McKillop; Malcolm D. Keen

[57] ABSTRACT

Alkaline earth metal scales, especially barium sulfate scale deposits are removed from oilfield pipe and other tubular goods with a scale-removing composition comprising an aqueous alkaline solution having a pH of about 8 to about 14, a polyaminopolycarboxylic acid, preferably EDTA or DTPA and a catalyst or synergist comprising oxalate anion. When the scale-removing solution is contacted with a surface containing a scale deposit, substantially more scale is dissolved at a faster rate than previously possible.

8 Claims, 7 Drawing Sheets

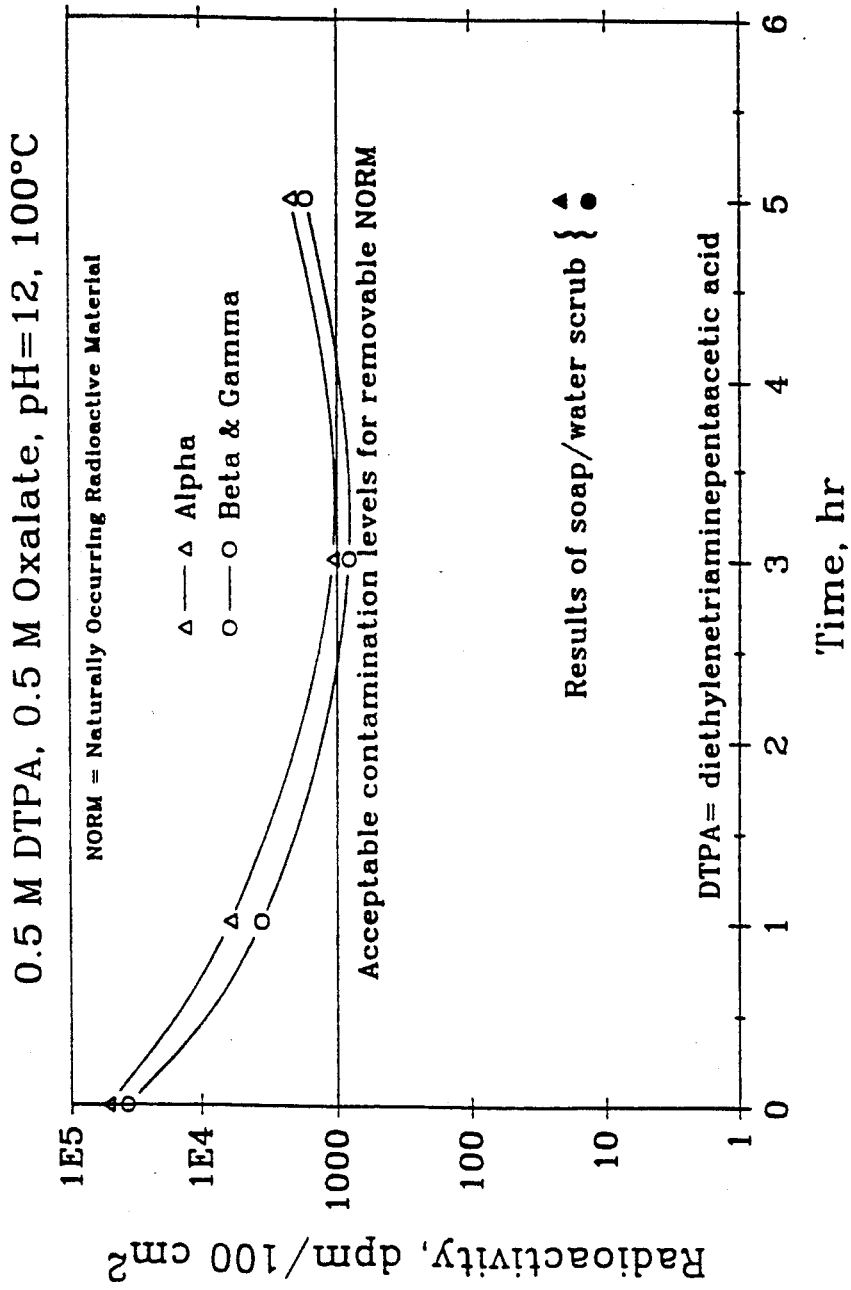

COMPOSITIONS FOR DISSOLUTION OF SULFATE SCALES

This is a division of copending application Ser. No. 369,897 filed on Jun. 22, 1989, now U.S. Pat. No. 4,980,077 which is a continuation-in-part of Ser. No. 332,147 now U.S. Pat. No. 5,093,020.

FIELD OF THE INVENTION

This invention relates to compositions which are effective for solubilizing and removing scale, particularly strontium and barium sulfate scale, from surfaces with scale deposits on them. It is particularly useful for the removal of such scale from oilfield equipment including downhole pipe, tubing and casing as well as subterranean formations. It is also applicable to the removal of these scale deposits from other equipment such as boilers and heat exchangers.

BACKGROUND OF THE INVENTION

Many waters contain alkaline earth metal cations, such as barium, strontium, calcium and magnesium, and anions, such as sulfate, bicarbonate, carbonate, phosphate, and fluoride. When combinations of these anions and cations are present in concentrations which exceed the solubility product of the various species which may be formed, precipitates form until the respective solubility products are no longer exceeded. For example, when the concentrations of the barium and sulfate ions exceed the solubility product of barium sulfate, a solid phase of barium sulfate will form as a precipitate. Solubility products are exceeded for various reasons, such as evaporation of the water phase, change in pH, pressure or temperature and the introduction of additional ions which can form insoluble compounds with the ions already present in the solution.

As these reaction products precipitate on the surfaces of the water-carrying or water-containing system, they form adherent deposits or scale. Scale may prevent effective heat transfer, interfere with fluid flow, facilitate corrosive processes, or harbor bacteria. Scale is an expensive problem in many industrial water systems, in production systems for oil and gas, in pulp and paper mill systems, and in other systems, causing delays and shutdowns for cleaning and removal.

Barium and strontium sulfate scale deposits present a unique and particularly intractable problem. Under most conditions, these sulfates are considerably less soluble in all solvents than any of the other commonly encountered scale-form ng compounds, as shown by the comparative solubilitie given in Table 1 below.

TABLE 1

| Comparative Solubilities. 25° C. in Water. | |
|---|---|
| Scale | Solubility, mg./l. |
| Gypsum | 2080.0 |
| Strontium sulfate | 140.0 |
| Calcium Carbonate | 14.0 |
| Barium sulfate | 2.3 |

It is generally acknowledged that barium sulfate scale is extremely difficult to remove chemically, especially within reasonably short periods of time: the solvents which have been found to work generally take a long time to reach an equilibrium concentration of dissolved barium sulfate, which itself is usually of a relatively low order. Consequently, barium sulfate must be removed mechanically or the equipment, e.g. pipes, etc., containing the deposit must be discarded.

The incidence of barium sulfate scale is worldwide, and it occurs principally in systems handling subsurface waters. Because of this, the barium sulfate scale problem is of particular concern to the petroleum industry as water is generally produced with petroleum and as time goes on, more petroleum is produced by the waterflooding method of secondary recovery, implying even greater volumes of produced water. The scale may occur in many different places, including production tubing, well bore perforations, the area near the well bore, gathering lines, meters, valves and in other production equipment. Barium sulfate scale may also form within subterranean formations such as in disposal wells. Scales and deposits can be formed to such an extent that the permeability of the formation is impaired resulting in lower flow rates, higher pump pressures, and ultimately abandonment of the well.

Barium sulfate scale is particularly troublesome when sulphate-rich seawater is used as an injection fluid in oil wells whose formation water is rich in barium ions. This particular aspect of the barium scale problem is severe in some U.S. oil fields as well as some older North Sea oil fields. Scaling of this nature is also expected to occur during advanced production stages in other North Sea fields particularly after seawater breakthrough has taken place.

Another problem associated with the formation of barium and strontium sulfate scales is that radium, another member of the alkaline earth group of metals tends to be deposited at the same time so that the equipment becomes radioactive, and may eventually have to become unusable for safety reasons alone. At present, a considerable amount of oilfield tubular goods are in this condition and cannot be readily restored to usable condition because of the difficulty of removing the radioactive scale.

Various proposals have been made in the past for removing barium sulfate scale chemically. Most of these processes have utilised chelating or complexing agents, principally the polyaminopolycarboxylic acids such as ethylenediaminetetraacetic acid(EDTA) or diethylenetriaminepentaacetic acid(DTPA).

U.S. Pat. No. 2,877,848(Case) discloses the use of EDTA in combination with various surfactants for this purpose. U.S. Pat. No. 3,660,287 (Quattrini) discloses the use of EDTA and DTPA in the presence of carbonate ion at relatively neutral pH (6.5-9.5) and U.S. Pat. No. 4,708,805(D'Muhala) discloses a process for the removal of barium sulfate scale by sequestration using an aqueous solution of citric acid, a polycarboxylic acid such as carbazic acid, and an alkylene-polyaminopolycarboxylic acid such as EDTA or DTPA. The preferred aqueous sequestering solutions have a pH in the range of about 9.5 to about 14, provided by a base such as potassium hydroxide or potassium carbonate.

Another approach which has recently been made is to use a polyether in combination with the aminopolycarboxylic acid. U.S. Pat. No. 4,190,462 (deJong) discloses that barium sulfate scale can be removed from remote locations extending into a subterranean earth formation by contacting the scale with an aqueous solution consisting essentially of water, a monovalent cation salt of a monocyclic macroyclic polyamine containing at least two nitrogen-linked carboxymethyl groups and enough monovalent basic compound to provide a solution pH of about 8. Similar disclosures are to be found in U.S. Pat. Nos. 4,215,000 and 4,288,333. These polyether materials have, however, the disadvantage of being costly which is a severe drawback for oilfield use where cost is a major factor.

Although many of these known compositions will remove scale, the rate of dissolution is slow and the amount of scale dissolved is small.

SUMMARY OF THE INVENTION

We have now found a way of removing barium sulfate scale using a novel combination of scale-removing agents. This combination is capable of removing scale at markedly higher speeds than prior scale-removing compositions and is also capable of removing relatively more scale for a given quantity of solvent. It is, moreover, relatively cheap and is therefore well suited to use in oilfield operations.

According to the present invention, barium sulfate and other sulfate scales are removed by a chemical process using a combination of a polyaminopolycarboxylic acid such as EDTA or DTPA together with an oxalate anion as a synergist or catalyst for the dissolution. The scale is removed under alkaline conditions, preferably at pH values of at least 10, usually 10-14, with best results being achieved at about pH 12.

The concentration of synergist or catalyst is usually about 0.01M to about 1.0M, preferably about 0.5M, with similar concentrations being appropriate for the primary chelant (the polyaminopolycarboxylic acid). Substantially improved scale dissolution rates are obtained when the aqueous solution containing the composition is at a temperature of about 25° C. to about 100° C. but higher temperatures are obtainable downhole because at greater formation depths higher existing pressures will raise the boiling point of the aqueous solution, and cosequently greater scale removal rates may be attained.

The composition is particularly useful for more efficiently removing barium or strontium sulfate scale from wells, wellstream processing equipment, pipelines and tubular goods used to produce oil from a subterranean formation.

THE DRAWINGS

FIG. 1 is a graph which shows the rate of dissolution of barium sulfate in various solvents, FIG. 2 is a graph which shows the efect of chelant concentration on the rate of barium sulfate dissolution, FIG. 3 is a graph which shows the effect of chelant concentration on the rate of barium sulfate dissolution, FIG. 4 is a graph which shows effect of temperature on the rate of barium sulfate dissolution, FIG. 5 is a graph which shows the respective rates of dissolution of various sulfate species on a chelant-containing solvent, FIG. 6 is a graph which shows the respective rates of dissolution of various barium sulfate species in a chelant-containing solvent, FIG. 7 is a graph which shows the low residual rates of radioactivity which may be achieved for contaminated oilfield pipe by use of the present scale removal process.

DETAILED DESCRIPTION

Figure 1:
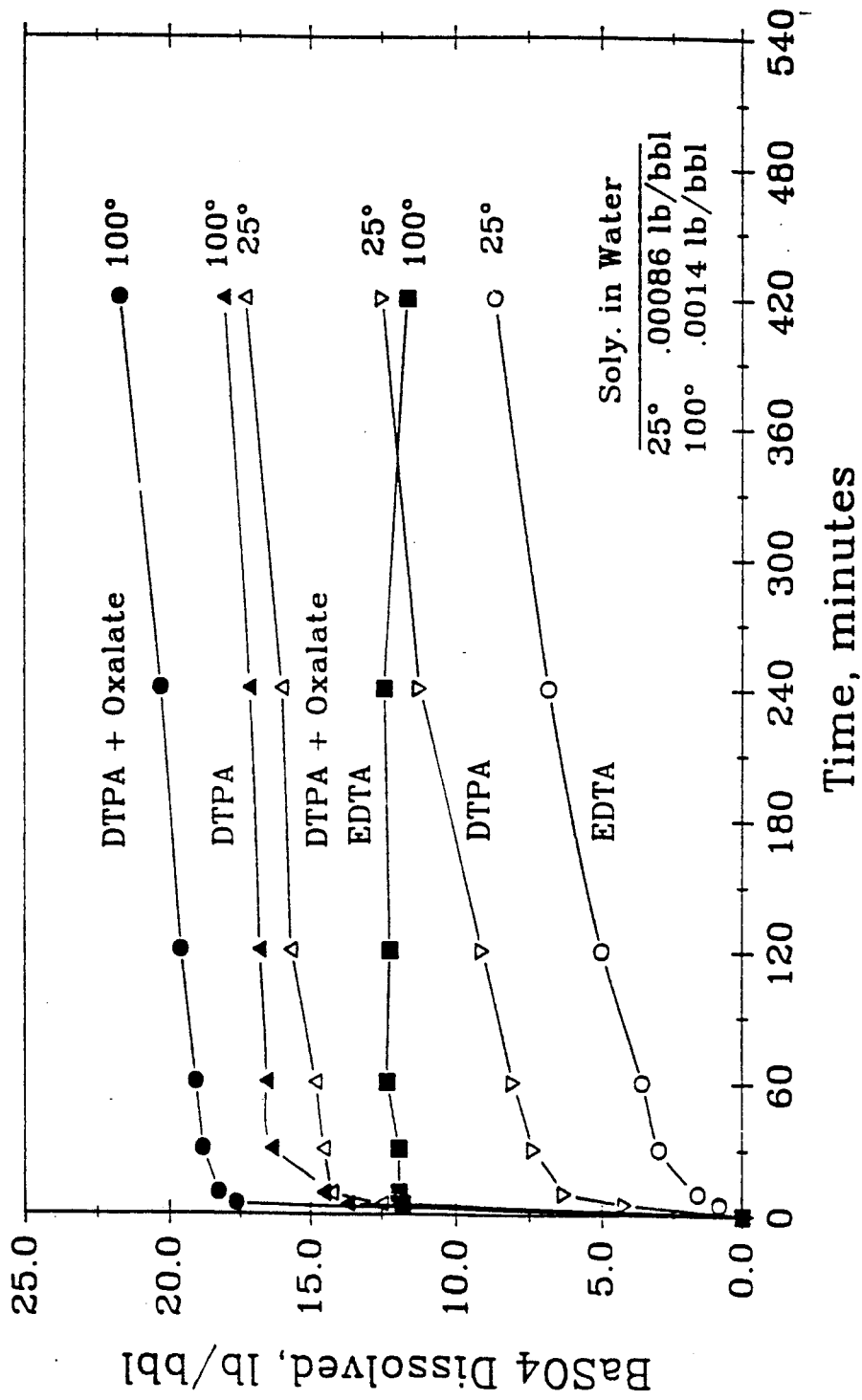

According to the present invention, alkaline earth metal sulfate scales, especially barium sulfate scale, are removed by the use of a combination of chemical scale-removing agents. The method is particularly useful for the removal of such scale from oilfield equipment used to bring oil and/or water from subterranean formations to the surface. The method may, however, also be used to remove scale from the formations themselves, especially in the regions surrounding production and injection wells, as mentioned above. The method may also be used to remove scale from above- ground equipment both in the oilfield and elsewhere, for example, from boilers and heat exchangers and other equipment exposed to scale-forming conditions.

The scale itself is usually in the form of an adherent deposit of the scale-forming mineral on metal surfaces which have been exposed to the water containing the scale-forming components. These components comprise alkaline earth metals including calcium, strontium and barium, together with variable amounts of radium, depending upon the origin of the waters. As noted above, barium sulfate scale is particularly difficult to remove by existing chemical methods in view of its very low solubility.

The present scale removal is effected with an aqueous solvent which comprises a polyaminopolycarboxylic acid such as EDTA or DTPA as a chelant or chelating agent which is intended to form a stable complex with the cation of the alkaline earth scale-forming material. Of these chelants, DTPA is the preferred species since it forms the most soluble complexes at greatest reaction rate. EDTA may be used but is somewhat less favorable as will be shown below. The chelant may be added to the solvent in the acid form or, alternatively, as a salt of the acid, preferably the potassium salt. In any event the alkaline conditions used in the scale removal process will convert the free acid to the salt.

The concentration of the chelant in the solvent should normally be at least 0.1M in order to achieve acceptable degree of scale removal. Chelant concentrations in excess of 1.0M are usually not necessary and concentrations from about 0.3M up to about 0.6M will normally give good results; although higher concentrations of chelant may be used, there is generally no advantage to doing so because the efficiency of the chelant utilisation will be lower at excess chelant concentrations. This economic penalty is particularly notable in oilfield operations where large volumes of solvent may be used, especially in formation scale removal treatment.

The concentration of the catalyst or synergist in the aqueous solvent will be of a similar order: thus, the amount of the oxalate anion in the solvent should normally be at least 0.1M in order to achieve a perceptible increase in the efficiency of the scale removal, and concentrations from about 0.3M up to about 0.6M will give good results. Although higher concentrations of the oxalate e.g. above 1.0M may be used, there is generally no advantage to doing so because the efficiency of the process will be lower at excess catalyst concentrations. Again, this economic penalty is particularly notable in oilfield operations.

As with the chelant, the oxalate may be added as the free acid or the salt, preferably the potassium salt. If the free acid is used, addition of the potassium base to provide the requisite solution pH will convert the acid to the salt form under the conditions of use.

The scale removal is effected under alkaline conditions preferably at pH values of from about 8.0 to about 14.0, with optimum values being from about 11 to 13, preferably about 12.

The prefered solvents comprise about 0.1 to about 1.0M of ethylenediaminetetraacetic acid (EDTA) or diethylenetriaminepentaacetic acid (DTPA), or salts of these acids, as a chelant. In addition, the oxalate catalyst is added to the aqueous solution in about 0.01 to about 1.0, preferably about up to 0.5M. The pH of the solvent is then adjusted by the addition of a base to the desired value, preferably to about pH 12. We have found that it is important to avoid the use of sodium cations when operating at high pH values, above pH 8, and instead, to use potassium or, alternatively, cesium as the cation of the scale-removing agent. Potassium is preferred for economy as well as availability. Thus, the normal course of making up the solvent will be to dissolve the chelant and the oxalic acid (or potassium oxalate) in the water to the desired concentration, after which a potassium base, usually potassium hydroxide is added to bring the pH to the desired value of about 12. This aqueous composition can be used to remove scale from the equipment, or alternatively, pumped into the subterranean formation when it is the formation which is to be subjected to descaling.

The mode of operation of the oxalate synergist or catalyst is not presently understood. While not desiring to be bound to a particular theory concerning the actual mechanism of its activity in converting or dissolving the scale, it is believed that adsorption of the synergist or catalyst on the barium sulfate surface may modify the surface crystal structure in such a way that the barium in the modified crystal is easily removed by the chelating agent.

The aqueous solution containing the composition can be directed down a wellbore to remove barium sulfate scale which has fouled the tubular equipment e.g. piping, casing etc., and passage ways. Prior to being directed into the wellbore, the composition may be heated to a temperature between about 25° C. to about 100° C., although the temperatures prevailing downhole may make pre-heating unnecessary. Once within the tubular goods and the passageways requiring treatment, the composition is allowed to remain there for about ten minutes to about 7 hours. After remaining in contact with the equipment for the desired time, the composition containing the dissolved scale is produced to the surface and may be disposed of as required, possibly by re-injection into the subsurface formation. This procedure can be repeated as often as required to remove scale from the equipment.

In one procedure for circulating the solvent through the tubular goods in the well the solvent is pumped down through the production tube and returned to the surface through the annular space between the production tubes and the casing (or vice versa). Also, the cleaning solution may be pumped down through the production tubing and into the formation, thereby cleaning the well, including the well casing, and the formation pore space by dissolving barium sulfate present as it flows over and along the surfaces that need cleaning. The spent composition containing the dissolved, complexed barium together with any other alkaline earth metal cations which may have been present in the scale, especially radium, can be subsequently returned to the surface, for example, by displacement or entrainment with the fluids that are produced through the well after the cleaning operation. In an alternative manner, the cleaning solution may be applied batchwise fashion, for example, by flowing the solution into the well and optionally into the pore spaces of the adjacent earth formation and there keeping the solution in contact in non-flowing condition with the surfaces that are covered with barium sulfate scale, for a period of time sufficient to dissolve the scale.

In order to demonstrate the barium sulfate scale-dissolving capacities of the composition, several aqueous solutions have been tested in laboratory tests the results of which are described in the discussions which follow. The experiments described below were, except as noted below, carried out in a cylindrical glass vessel having a height of 10 cm and an internal diameter of 7.5 cm. Barium sulfate or, when applicable, other sulfates or solid scale components, were agitated with the selected solvents and the rates of dissolution and final dissolved concentrations determined. The results are reported graphically in the Figures.

As shown in FIG. 1, various concentrations of EDTA, DTPA, and DTPA with oxalate were compared at 25° C. and 100° C. The results demonstrate that the DTPA/oxalate combination complexes more barium sulfate than DTPA alone and that DTPA is more effective than EDTA at both temperatures. Furthermore, when the oxalate is present with the DTPA, the equilibrium concentration of dissolved barium sulfate is reached far more quickly than with either the EDTA the DTPA, which have not attained equilibrium after 7 hours at the termination of the experiment.

Figure 2:
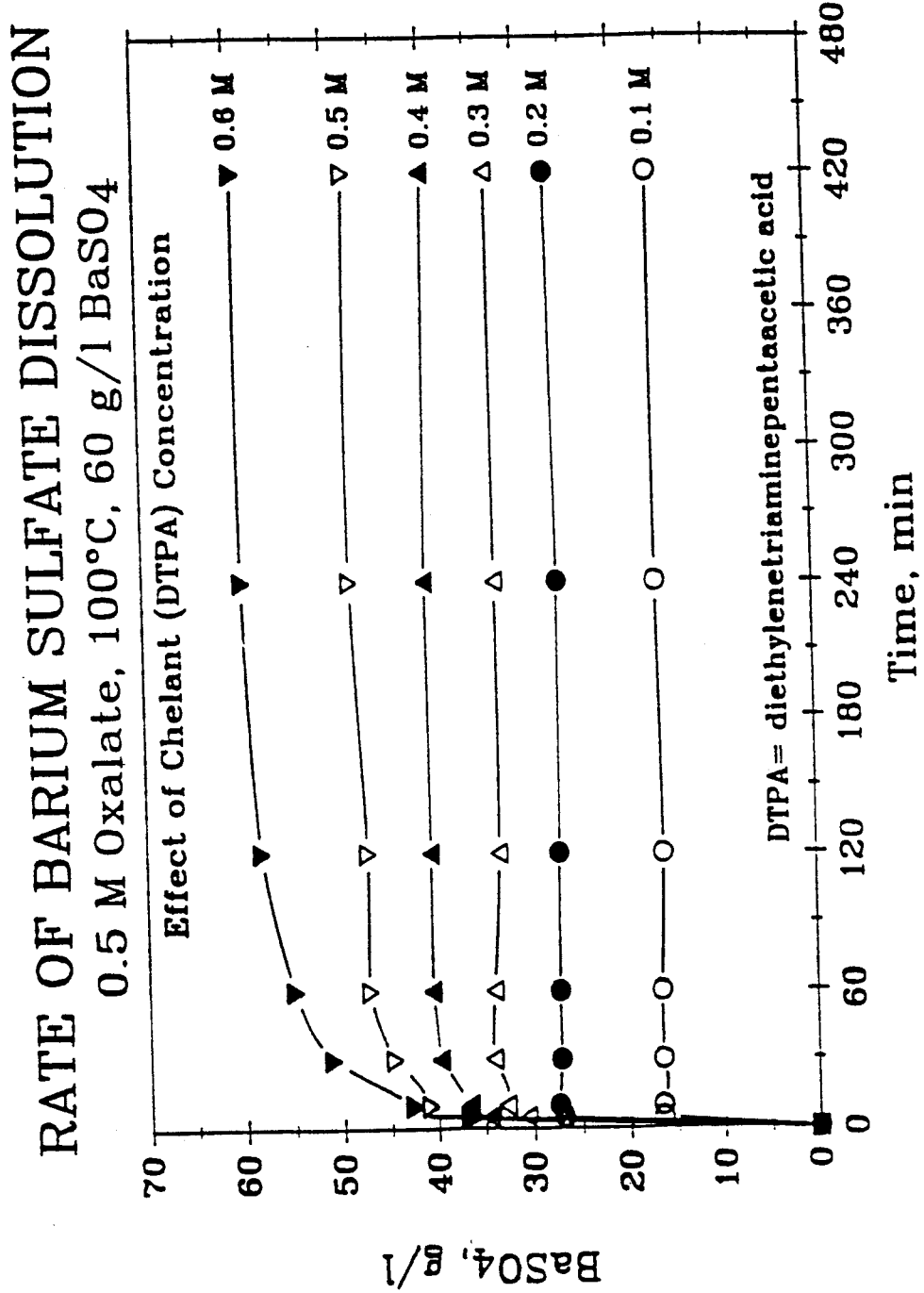

The dissolution of the barium sulfate or other scale in the solvent is influenced by the amount of chelant used. The effect of varying the DTPA concentration (at 100° C.) is shown in FIG. 2, at chelant concentrations from 0.1M to 0.6M. Increased DTPA concentration causes an increase in the rate of barium sulfate dissolution and the amount of barium sulfate held in the solvent. It should be noted in particular that the final equilibrium concentration of barium sulfate is 60 g./l which is far in excess of the solubility in water alone.

Figure 3:
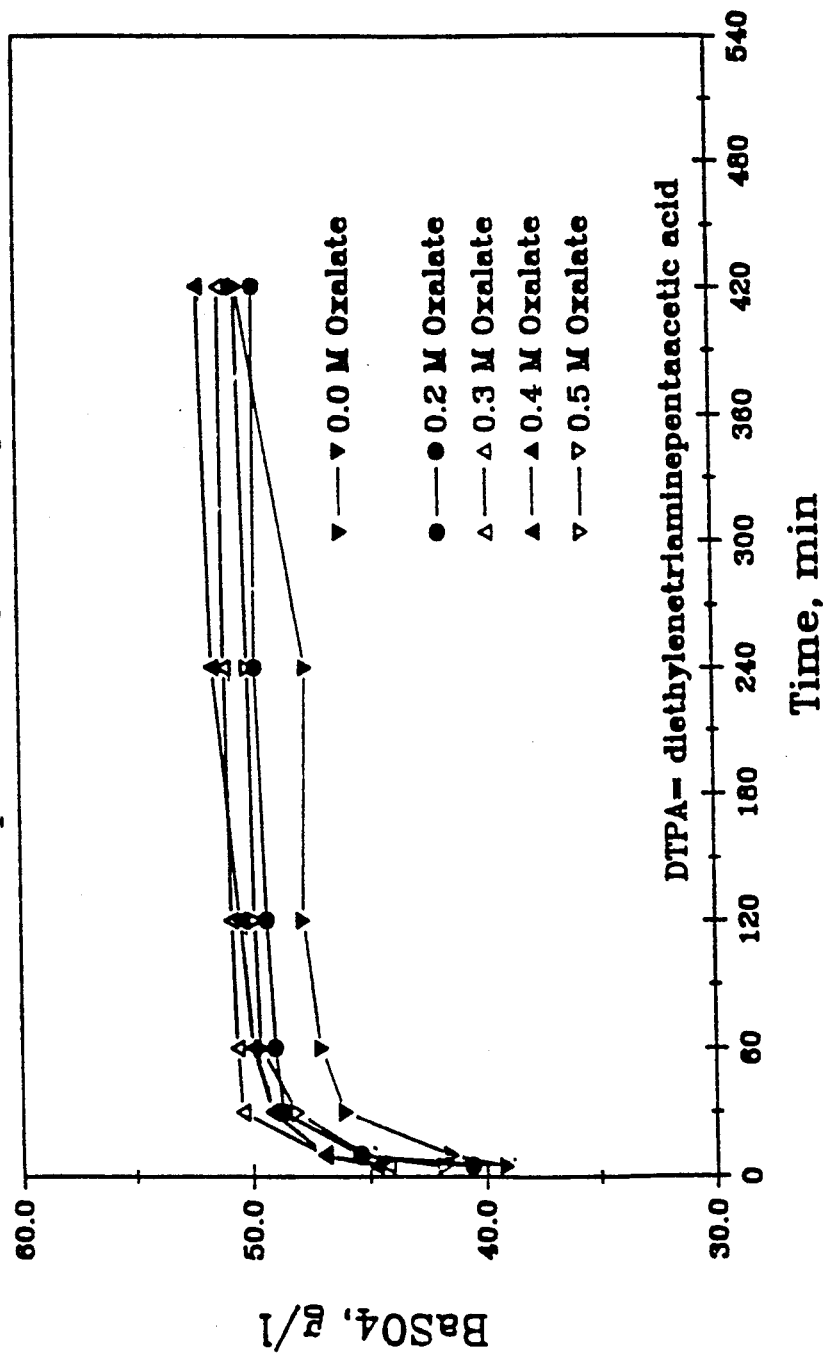

The amount of oxalate catalyst utilized in combination with DTPA is not critical within the limits described above. This is illustrated in FIG. 3 which shows that all concentrations of oxalate catalyst contribute to the dissolution of 80 to 90 percent of the saturation level of barium sulfate within ten (10) minutes of contact. Thus, as demonstrated by FIG. 3, the fast rate of dissolution is a significant feature of the present scale removal technique. In practical applications of the method, therefore, contact times of less then about 4 hours e.g. 1 or 2 hours, may be sufficient, depending on the scale thickness. Another significant feature of the technique is the high equilibrium (saturation) levels of dissolved barium, strontium and calcium sulfate scales which are obtained in the aqueous solution, making the process particularly efficient in terms of solvent utilisation.

Figure 4:
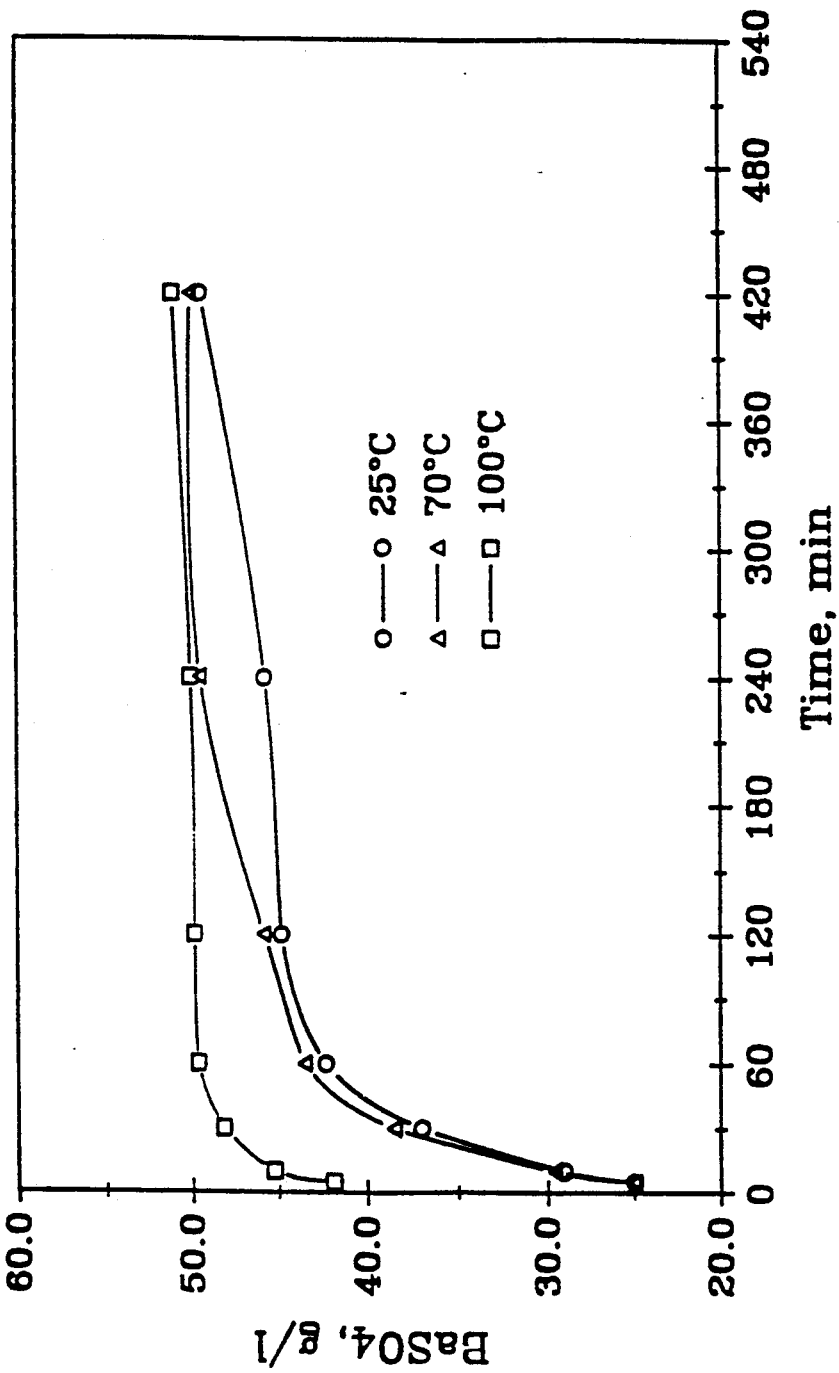

FIG. 4 shows that the rate of dissolution of the barium sulfate scale is related to temperature, with faster rates of dissolution being attained at the higher temperature (100° C.)

Figure 5:
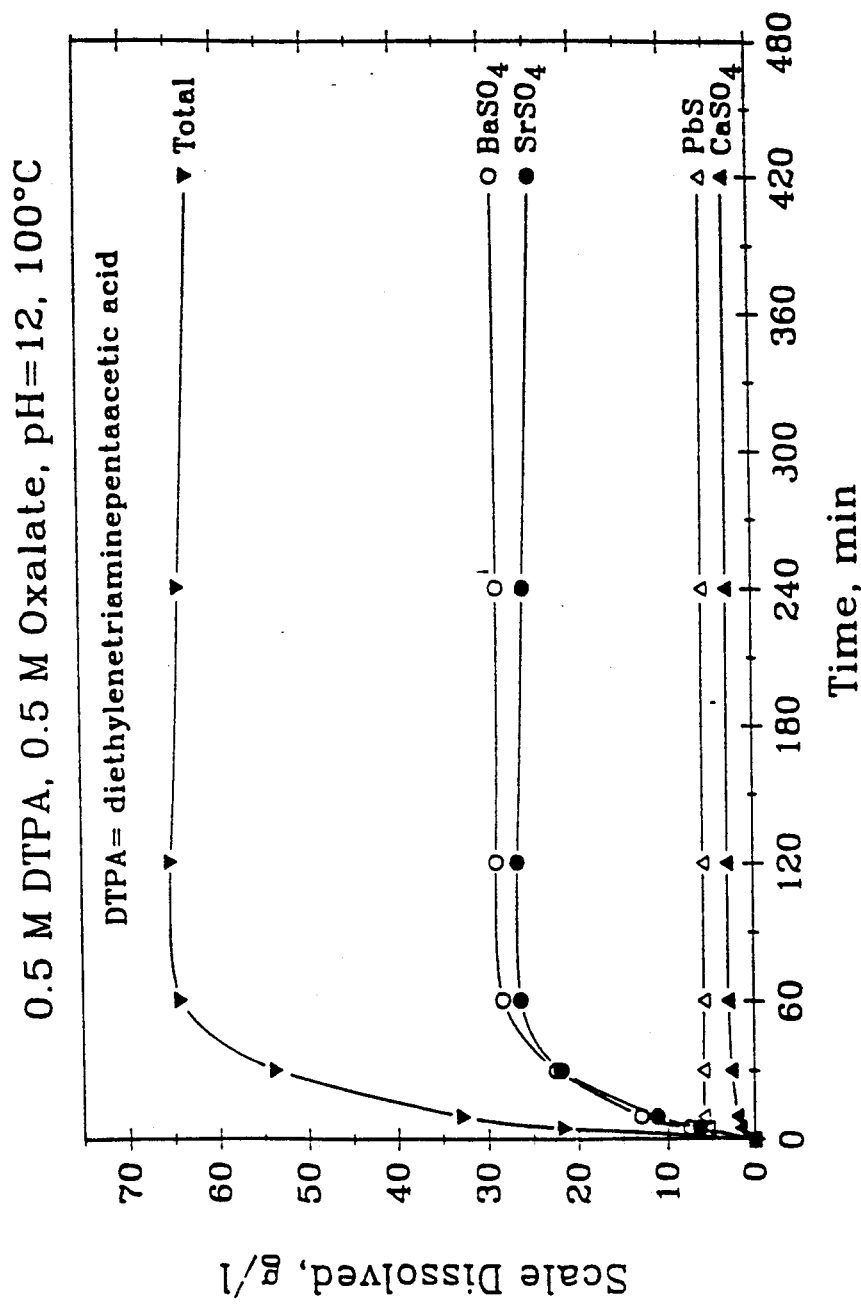

FIG. 5 shows the results of a batch test carried with scale material removed from field tubing similar to that used in a continuous flow loop test in which the test solution was circulated. The samples of scale material were added to the solvent (0.5M DTPA, 0.5M oxalate pH=12, 100° C.) in a concentration equivalent to 60 g./l. of scale. The concentrations of the different species dissolved in the solvent at different times were determined. The results of the batch tests are shown in the figure and indicate that in addition to the dissolution of the barium, the strontium sulfate also reaches equilibrium concentration in a very short time. The results from yhe flow loop tests are similar but with much lower final concentrations.

Figure 6:
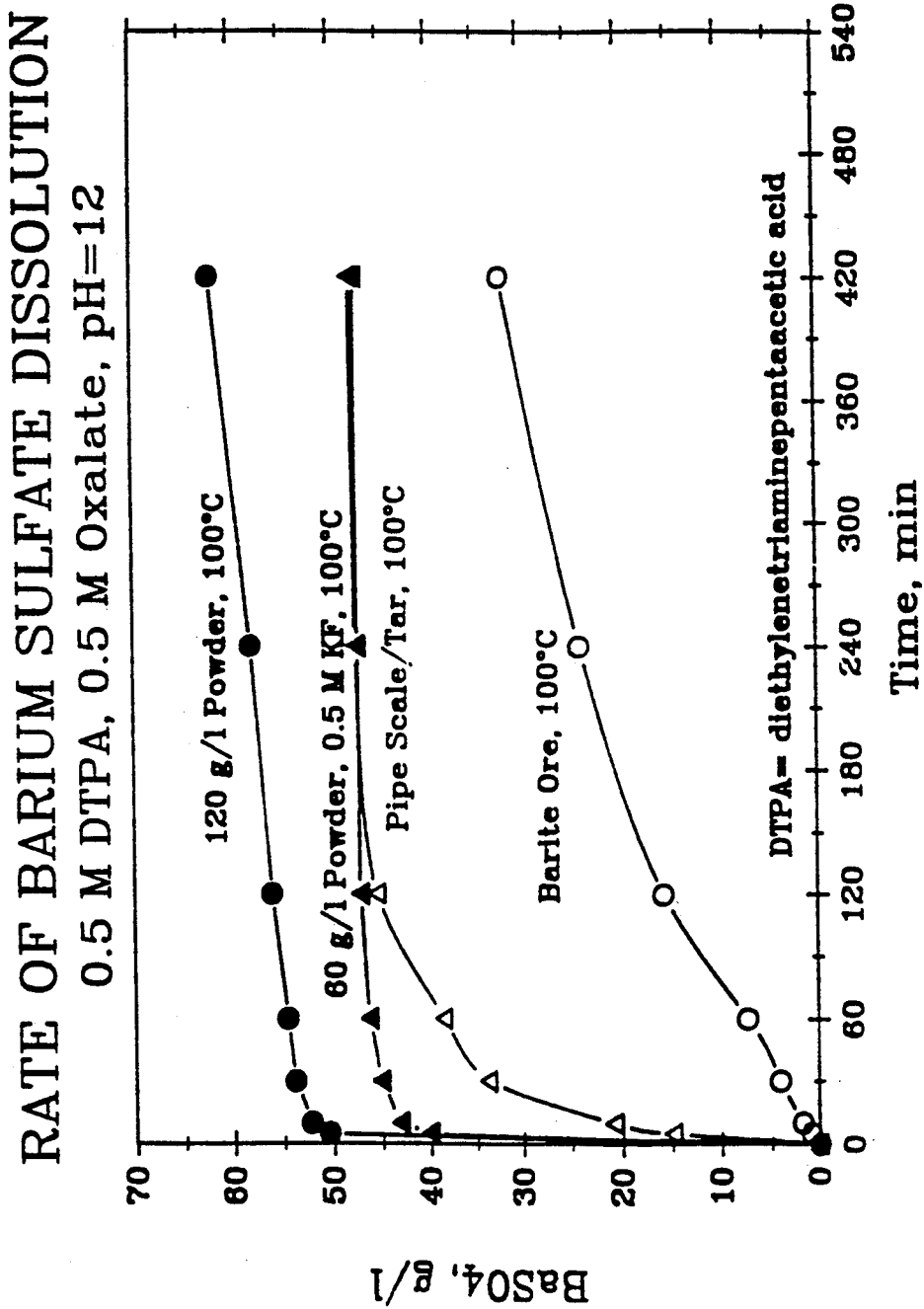

FIG. 6 shows that the scale removal process is effective both with barium sulfate in the powder form and also with actual pipe scale/tar mixtures and with barite ore ($BaSO_4$)

FIG. 7 shows that the present scale removal technique is very effective for lowering residual radioactivity of pipe contaminated with radium-containing barium sulfate scale. As noted above, radium is frequently precipitated with barium in scale with the result that scaled pipe is often radioactive to the point that it cannot safely be used. A continuous flow loop test was used to remove the scale from pipe which was similar to that used with FIG. 5 and the radioactivity was determined at successive times during the test. As shown in the Figure, the activity was reduced to an acceptable level after three hours without further treatment. It appears, however, that some residual activity arises from lead and other radio-isotopes which are not dissolved in the solvent (see FIG. 5); these isotopes are decay products of radium and have originally been incorporated in the scale with the barium and the radium sulfates. Although they are not removed chemically by the present scale removal technique, the dissolution of the barium scale together with the other alkaline earth metal sulfates enabled these othe components of the scale to be removed by simple abrasion. For FIG. 7, the descaled pipe was scrubbed with a soft bristle brush using a detergent/water scrub solution. The result was to reduce the residual activity level to a very low value, below the appropriate regulatory standards. Thus, by using the present chemical scale removal technique in combination with a simple mechanical removal of loose, non-adherent material, previously radioactive pipe may quickly and readily be restored to useful, safe condition.

Distilled water was used in the majority of the above tests (except the continuous flow loop tests) for determination of the rate of barium sulfate dissolution and saturation. Some tests were run with Dallas city tap water and synthetic seawater. A minor decrease in efficiency was observed with tap water. About a 20 percent decrease in efficiency was observed when seawater was used. This was expected, since seawater has interfering ions, e.g. calcium and magnesium. These interfering ions complex with the chelating agent, either DTPA or EDTA, and reduce the overall dissolving power. Additionally, it has been determined that halide ions have a negative effect on dissolving power as a function of the size of the halide ion. Dissolution rate is increased as the halide ion size is reduced and the charge density is increased, i.e. in the order of iodide, bromide, chloride and fluoride. Fluoride ion enhances the effect of EDTA-based solvents, but not DTPA: fluoride inhibits most DTPA/catalyst solvents.

As noted above, the effect of cations is also very important to the success of the scale solvent, especially when added with the sizable portion of caustic required to adjust the pH to 12. Dissolution is enhanced as the size of the cation is increased, i.e. lithium, sodium, potassium and cesium. Lithium and sodium hydroxides in the presence of EDTA, or DTPA, and catalysts are not soluble at a pH of 12, the optimum value. Cesium is too difficult to obtain, both in quantity and price. Therefore, potassium hydroxide, in the form of caustic potash, is the pH adjusting reagent of choice.

One example of a preferred aqueous solvent which can be used comprises 0.5M DTPA and 0.3M oxalic acid adjusted to a pH of 12 with potassium hydroxide.

We claim:

1. A composition for dissolving an alkaline earth metal sulfate scale consisting essentially of:
    a) an aqueous solution having a pH of from about 10 to about 14 which is provided by the presence of potassium hydroxide;
    b) a chelating agent comprising a polyaminopolycarboxylic acid or a salt of such an acid in an amount from about 0.1M to about 1.0M; and
    c) a synergistic scale-dissolving quantity of oxalate anion in an amount from 0.1M to 1.0M.

2. The composition as recited in claim 1 where the chelating agent is EDTA or DTPA.

3. The composition as recited in claim 1 where the chelating agent is present in an amount of from 0.3M to 0.6M.

4. The composition as recited in claim 1 where the oxalate anion is present in a concentration of from 0.1M to 0.6M.

5. The composition as recited in claim 4 where the oxalate anion is present in a concentration of 0.3M to 0.6M.

6. The composition as recited in claim 1 where the pH is adjusted to about 12 with potassium hydroxide, the chelant comprises DTPA and the synergist comprises oxalate anions.

7. The composition as recited in claim 1 where the pH of the solution is from 10 to 13.

8. The composition as recited in claim 1 where the pH of the solution is about 12.

* * * * *